United States Patent
Pei et al.

(10) Patent No.: US 11,842,726 B2
(45) Date of Patent: Dec. 12, 2023

(54) METHOD, APPARATUS, ELECTRONIC DEVICE AND STORAGE MEDIUM FOR SPEECH RECOGNITION

(71) Applicant: BEIJING BAIDU NETCOM SCIENCE AND TECHNOLOGY CO., LTD., Beijing (CN)

(72) Inventors: Jing Pei, Beijing (CN); Xiantao Chen, Beijing (CN); Meng Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 227 days.

(21) Appl. No.: 17/469,824

(22) Filed: Sep. 8, 2021

(65) Prior Publication Data

US 2021/0407497 A1    Dec. 30, 2021

(30) Foreign Application Priority Data

Feb. 26, 2021    (CN) .......................... 202110221216.0

(51) Int. Cl.
*G10L 15/08*    (2006.01)
(52) U.S. Cl.
CPC ........ *G10L 15/08* (2013.01); *G10L 2015/088* (2013.01)
(58) Field of Classification Search
CPC . G10L 15/08; G10L 2015/088; G10L 15/187; G10L 15/10
USPC ........................................................ 704/251
See application file for complete search history.

(56) References Cited

U.S. PATENT DOCUMENTS

| 6,249,763 B1* | 6/2001 | Minematsu ............. G10L 15/07 704/254 |
| 6,249,764 B1* | 6/2001 | Kamae .................... G10L 15/30 704/E15.047 |
| 7,711,560 B2* | 5/2010 | Yamada ................ G10L 15/065 704/251 |

(Continued)

FOREIGN PATENT DOCUMENTS

| CN | 101923854 A | 12/2010 |
| CN | 107305768 A | 10/2017 |

(Continued)

*Primary Examiner* — Thuykhanh Le
(74) *Attorney, Agent, or Firm* — Mauriel Kapouytian Woods LLP; Liang Huang; Wensheng Ma

(57) ABSTRACT

A computer-implemented method for speech recognition is disclosed. The method includes extracting a feature word associated with location information from a speech to be recognized, and calculating a similarity between the feature word and respective ones of a plurality of candidate words in a corpus. The corpus includes a first sub-corpus associated with at least one user, and the plurality of candidate words include, in the first sub-corpus, a first standard candidate word and at least one first erroneous candidate word. The at least one first erroneous candidate word has a preset correspondence with the first standard candidate word. The method further includes in response to the similarity between the feature word and one or more of the at least one first erroneous candidate word satisfying a predetermined condition, outputting the first standard candidate word as a recognition result based on the preset correspondence.

17 Claims, 3 Drawing Sheets

(56) References Cited

U.S. PATENT DOCUMENTS

| | | | |
|---|---|---|---|
| 8,631,355 B2* | 1/2014 | Murillo | G06F 16/436 |
| | | | 715/863 |
| 10,522,133 B2* | 12/2019 | Labsky | G10L 13/00 |
| 10,757,207 B1* | 8/2020 | Kharwandikar | G08B 21/22 |
| 11,043,215 B2* | 6/2021 | Galustyan | G10L 15/02 |
| 11,386,890 B1* | 7/2022 | Fan | G06F 40/30 |
| 11,545,154 B2* | 1/2023 | Park | G10L 17/02 |
| 11,615,785 B2* | 3/2023 | Zhou | G10L 15/1822 |
| | | | 704/257 |
| 11,641,592 B1* | 5/2023 | Duraibabu | G10L 15/22 |
| | | | 704/270.1 |
| 2001/0029455 A1* | 10/2001 | Chin | G06F 40/58 |
| | | | 704/277 |
| 2001/0047254 A1* | 11/2001 | Rising, III | G06F 16/367 |
| | | | 707/E17.058 |
| 2004/0210437 A1* | 10/2004 | Baker | G10L 15/08 |
| | | | 704/251 |
| 2006/0074661 A1* | 4/2006 | Takaichi | G10L 15/22 |
| | | | 704/E15.04 |
| 2009/0037448 A1* | 2/2009 | Thomas | H03M 7/3084 |
| 2011/0060584 A1* | 3/2011 | Ferrucci | G06F 40/232 |
| | | | 704/9 |
| 2012/0304057 A1* | 11/2012 | Labsky | G10L 13/00 |
| | | | 715/256 |
| 2013/0061139 A1* | 3/2013 | Mahkovec | G06F 40/232 |
| | | | 715/257 |
| 2013/0114626 A1* | 5/2013 | Bellessort | H03M 7/6052 |
| | | | 370/477 |
| 2016/0047670 A1* | 2/2016 | Grün | G06F 3/0482 |
| | | | 704/9 |
| 2016/0212103 A1* | 7/2016 | Rhoads | H04L 63/0869 |
| 2016/0341564 A1* | 11/2016 | Cheng | G01C 21/3641 |
| 2017/0133007 A1 | 5/2017 | Drewes | |
| 2017/0358293 A1* | 12/2017 | Chua | G10L 13/0335 |
| 2020/0104362 A1* | 4/2020 | Yang | G06N 5/048 |
| 2020/0173788 A1* | 6/2020 | Liu | G01S 19/47 |
| 2020/0335096 A1* | 10/2020 | Li | G06N 3/04 |
| 2020/0357412 A1* | 11/2020 | Robert Jose | G10L 15/1815 |
| 2021/0027766 A1* | 1/2021 | Shi | G10L 15/063 |
| 2021/0064030 A1* | 3/2021 | Jiang | G08G 1/096877 |

FOREIGN PATENT DOCUMENTS

| | | |
|---|---|---|
| CN | 107622054 A | 1/2018 |
| CN | 109753636 A | 5/2019 |
| CN | 109949797 A | 6/2019 |
| CN | 110246499 A | 9/2019 |
| CN | 110277090 A | 9/2019 |
| CN | 110765763 A | 2/2020 |
| CN | 111369996 A | 7/2020 |
| CN | 111710328 A | 9/2020 |
| CN | 112201238 A | 1/2021 |
| JP | 3682958 B2 | 8/2005 |

* cited by examiner

METHOD, APPARATUS, ELECTRONIC DEVICE AND STORAGE MEDIUM FOR SPEECH RECOGNITION

CROSS REFERENCE TO RELATED APPLICATION

This application claims priority to Chinese Patent Application No. 202110221216.0 filed on Feb. 26, 2021, the contents of which are hereby incorporated by reference in their entirety for all purposes.

TECHNICAL FIELD

The present disclosure relates to the field of artificial intelligence and specifically to the field of speech recognition, and particularly relates to a method and apparatus for speech recognition, an electronic device, a computer-readable storage medium, and a computer program product.

BACKGROUND

With the development of artificial intelligence, more and more artificial intelligence products have provided convenience for people's lives. As important sensing intelligent products among artificial intelligence products, speech recognition products are widely used in various products such as smart home products and smart voice customer services. Speech recognition may free hands of a user to a large extent, not only allowing the user to experience the intelligence of a product, but also making it easy for the user to operate.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a method for speech recognition, a speech recognition apparatus, an electronic device, a computer-readable storage medium, and a computer program product.

According to an aspect of the present disclosure, a method for speech recognition is provided that comprises extracting, from a speech to be recognized, a feature word associated with location information; calculating a similarity between the feature word and respective ones of a plurality of candidate words in a corpus, wherein the corpus comprises a first sub-corpus associated with at least one user, and the plurality of candidate words comprise, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word; and in response to the similarity between the feature word and any of the at least one first erroneous candidate word satisfying a predetermined condition, outputting the first standard candidate word as a recognition result based on the preset correspondence.

According to another aspect of the present disclosure, it is provided an electronic device that comprises at least one processor; and a memory communicatively connected to the at least one processor, wherein the memory stores instructions executable by the at least one processor, which, when executed by the at least one processor, cause the at least one processor to perform the method for speech recognition as described above.

According to another aspect of the present disclosure, it is provided a non-transitory computer-readable storage medium storing computer instructions, wherein the computer instructions are used to cause the computer to perform the method for speech recognition as described above.

It should be understood that the content described in this section is not intended to identify critical or important features of the embodiments of the present disclosure, and is not used to limit the scope of the present disclosure either. Other features of the present disclosure will be easily understood through the following specification.

BRIEF DESCRIPTION OF THE DRAWINGS

The drawings show embodiments in examples and form a part of the specification, and are used to explain example implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION OF THE EMBODIMENTS

Example embodiments of the present disclosure are described below in conjunction with the accompanying drawings, wherein various details of the embodiments of the present disclosure are included to facilitate understanding, and should only be considered as example. Therefore, those of ordinary skill in the art should be aware that various changes and modifications can be made to the embodiments described herein, without departing from the scope of the present disclosure. Likewise, for clarity and simplicity, description of well-known functions and structures are omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

Embodiments of the present disclosure will be described below in detail in conjunction with the drawings.

Figure 1:
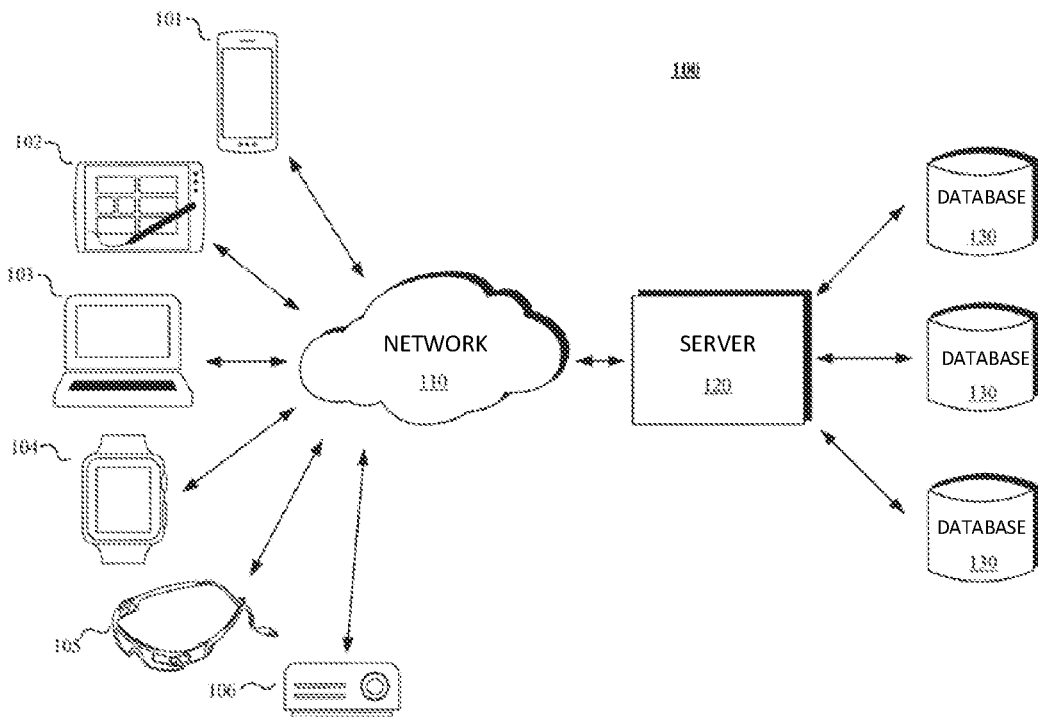
FIG. 1 is a schematic diagram of an example system in which various methods described in the present disclosure may be implemented according to an embodiment of the present disclosure.

FIG. 1 is a schematic diagram of an example system in which various methods described in the present disclosure may be implemented according to an embodiment of the present disclosure. Referring to FIG. 1, the system 100 may include one or more client devices 101, 102, 103, 104, 105, and 106 configured to receive speech, a server 120, and one or more communication networks 110 that couple the one or more client devices to the server 120. The client devices 101, 102, 103, 104, 105, and 106 may be configured to execute one or more application programs.

In an embodiment of the present disclosure, the server 120 may run one or more services or software applications that enable a method for speech recognition in the present disclosure to be performed.

In some embodiments, the server 120 may further provide other services or software applications that may include a non-virtual environment and a virtual environment. In some embodiments, these services may be provided as web-based services or cloud services, for example, they may be provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that are executable by one or more processors. The user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may send speech to the client devices 101, 102, 103, 104, 105, and/or 106. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices may run various types and versions of software application programs and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of the server). In various embodiments, the server 120 may run one or more services or software applications that provide functions described below.

A computing unit in the server 120 may run one or more operating systems including any of the above-mentioned operating systems and any commercially available server operating system. The server 120 may also run any of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from the user of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system to overcome the shortcomings of difficult management and weak service scalability in conventional physical host and virtual private server (VPS) services.

The system 100 may further include one or more databases 130. In some embodiments, these databases may be used to store data and other information. For example, one or more of the databases 130 may be used to store information such as an audio file and a video file. The database 130 may reside in various locations. For example, the database used by the server 120 may be locally in the server 120, or may be remote from the server 120 and communicate with the server 120 via a network-based or dedicated connection. The database 130 may be of different types. In some embodiments, the database used by the server 120 may be a relational database. One or more of these databases may store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 as illustrated in FIG. 1 may be configured and operated in various manners, such that the various methods and apparatuses described according to the present disclosure can be applied.

In the related art, for a scenario in which the location information needs to be acquired via the speech recognition, for example, during the use of a map or navigation application on a mobile phone, a low rate for correct recognition may occur due to the large amount of the location information, which results in poor user experience.

Figure 2:
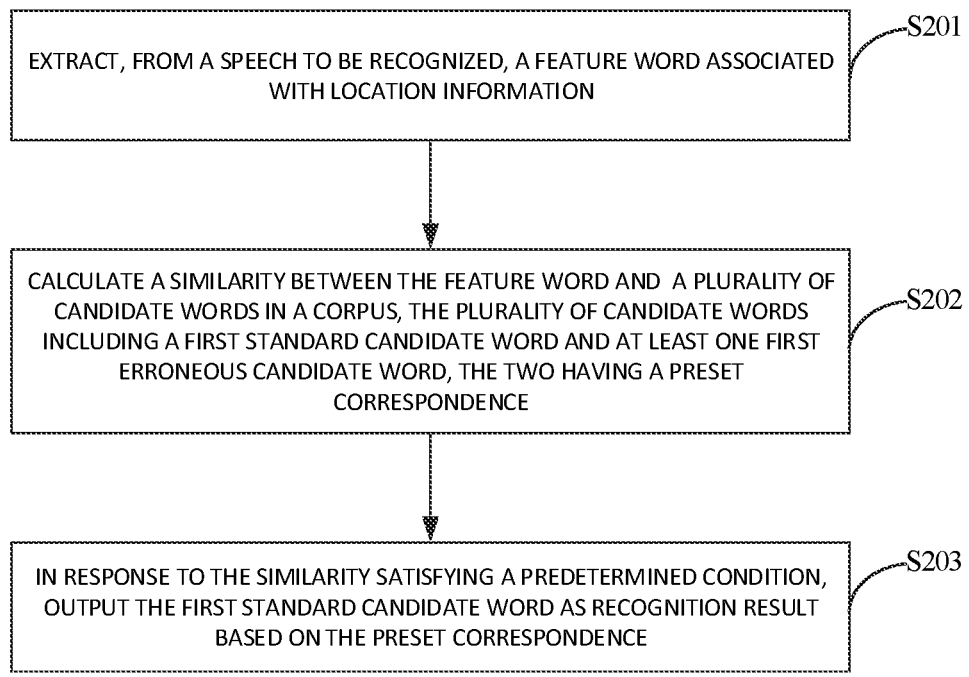
FIG. 2 is a flowchart of a method for speech recognition according to an embodiment of the present disclosure.

In order to solve the above technical problem, the present disclosure provides a method for speech recognition. FIG. 2 illustrates a flowchart of a method for speech recognition according to an embodiment of the present disclosure. As shown in FIG. 2, the method for speech recognition in the present disclosure may include:

S201: extracting, from a speech to be recognized, a feature word associated with location information;

S202: calculating a similarity between the feature word and respective ones of a plurality of candidate words in a corpus, wherein the corpus comprises a first sub-corpus associated with at least one user, and the plurality of candidate words comprise, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word; and S203: in response to the similarity between the feature word and any of the at least one first erroneous candidate word satisfying a predetermined condition, outputting the first standard candidate word as a recognition result based on the preset correspondence.

According to the method for speech recognition in the embodiment of the present disclosure, by mean of including a location name having a high incidence of speech recognition error, which is obtained based on a user error-correction behavior, and a predictive erroneous location name associated with the location name into the corpus, the accuracy of matching the feature word for speech recognition in the corpus can be improved, thereby improving the accuracy of speech recognition, and enhancing the user experience.

In step S201, the speech to be recognized may include a speech sent by the user, for example, to a client device. In an example, the client device may include the client device 101, 102, 103, 104, 105, and/or 106 as described in FIG. 1. In an example where the client device is a mobile phone, a map or navigation application may be installed on the mobile phone. When the user is to navigate using the map or navigation application, he or she may send a speech to indicate where to go. The feature word associated with a location may include a location name in the speech sent by the user representing the location. For example, when the user is going to a location named "Tiantongyuan", he or she may send a speech "I want to go to Tiantongyuan". In this case, a feature word "Tiantongyuan" would be extracted from the speech.

Specifically, after the speech sent by the user is received, the audio of the speech may be first preprocessed for obtaining a good quality so that it would facilitate the speech recognition. For example, the preprocessing may include performing noise reduction on the audio and filtering secondary information in the speech. The secondary information is, for example, an ambient noise or a sound not belonging to the user in the audio. Then, the preprocessed audio may be converted from audio to text. The conversion is thus from an analog signal to a digital signal. The feature word may be extracted based on the converted text. Extracting the feature word may include, for example, extracting the feature word from the text by using a semantic analysis technology. The semantic analysis technology may include a known technology such as semantic segmentation.

In step S202, the corpus may include a data set used for feature word matching, in which a plurality of candidate words for matching are included. The corpus is sometimes also referred to as a speech library, a speech model, etc. In an example where the client device is a mobile phone, a map or navigation application may be installed on the mobile phone, and the map or navigation application may be associated with the corpus, such as being able to access to the corpus to use a candidate word in the corpus for feature word matching. In an example, the corpus may be stored in a local storage of the mobile phone together with the map or navigation application, or may be stored in a remote server, such as the server 120 described in FIG. 1, for remote access.

According to the embodiment of the present disclosure, the corpus may be user-exclusive. User-exclusiveness may mean customization for the user. Therefore, the corpus may include a sub-corpus associated with the user. In the present disclosure, the concept of the user is not necessarily limited to one user, but may be extended to several users. In the example the map or navigation application, the user may refer to all users or at least some users who have used or are using the map or navigation application. Therefore, the corpus may include a first sub-corpus associated with the at least one user.

The first sub-corpus may include a standard candidate word and an erroneous candidate word. The standard candidate word may be a candidate word corresponding to a correct location name, while the erroneous candidate word may be a candidate word that is phonetically similar to the standard candidate word. Taking the location name "Tiantongyuan" described above as an example, the location name "Tiantongyuan" (in which the second character "tong" is pronounced as the first tone in Chinese) may be the standard candidate word, while words phonetically similar to the standard candidate word, such as "Tianlongyuan", "Tiantóngyuan" (in which the second character "tong" is pronounced as the second tone in Chinese; in order to distinguish from the standard candidate word, herein it is noted as "Tiantongyuan" for convenience) and "Tiankongyuan" may be erroneous candidate words. In terms of phonetic similarity, the erroneous candidate word may be a predictive extension for the standard candidate word. A specific manner of the predictive extension may be set depending on actual situations, for example, considering a similarity in pronunciation or accent.

The standard candidate word in the first sub-corpus may include a standard candidate word obtained based on the user error-correction behavior of the user. The location name corresponding to the standard candidate word, which is obtained based on the user error-correction behavior, may be considered as having a high possibility being erroneous during the speech recognition. The user error-correction behavior may be a behavior of the user re-entering a correct location name to make a correction to a previous speech recognition error. For example, the user may articulate the correct location name, or alternatively enter a text corresponding to the correct location name, or use other methods (such as a gesture operation, for example, for an applicable client device type) to enter the correct location name again. For example, the location name "Tiantongyuan" described above may be the standard candidate word that is obtained based on the user error-correction behavior of the user.

In the first sub-corpus, the erroneous candidate word may have a preset correspondence with the standard candidate word. In practice, due to the user's own pronunciation or accent or because of a noisy environment, in the above process of extracting the feature word, the correct location name that matches the user's intention may fail to be obtained, but a word phonetically similar to the correct location name is obtained. Therefore, in the embodiment of the present disclosure, a preset correspondence is set between the erroneous candidate word and the standard candidate word, such that even if an erroneous feature word is obtained in the process of extracting the feature word, a candidate word can be found in the corpus (that is, the erroneous candidate word), and then the correct location name may be recognized via the correspondence between the erroneous candidate word and the standard candidate word, thereby improving the accuracy of speech recognition. The preset correspondence may be a mapping relationship from the erroneous candidate word to the standard candidate word. In an example, when the erroneous candidate word is stored in the first sub-corpus, a piece of information or a flag for indicating the mapping relationship between the erroneous candidate word and the standard candidate word may be stored at the same time to indicate which standard candidate word the erroneous candidate word belongs to.

Optionally, the standard candidate word in the first sub-corpus may include a word associated with location information, which has ever been erroneously recognized or had not been recognized, causing the user error-correction behavior, and the erroneous candidate word in the first sub-corpus may include a word that is preset based on a pronunciation similarity to the standard candidate word.

In an example, if the location name "Tiantongyuan" in the user's speech has ever been erroneously recognized as, for example, "Tianlongyuan" and thus caused a user error-correction behavior, a standard candidate word may include, for example, "Tiantongyuan", and erroneous candidate words may include "Tianlongyuan" that is phonetically similar to "Tiantongyuan" and even more predictive extensions, such as "Tiantóngyuan" and "Tiankongyuan".

In another example, if a location name "Dashilanr" in the user's speech has not been recognized and thus caused a user error-correction behavior, a standard candidate word may include "Dashilanr", and erroneous candidate words may include, for example, "Dashilan" that is phonetically similar to "Dashilanr" and even more predictive extensions, such as "Dazhalan".

In this way, more location names with high incidences of speech recognition error can be included into the first sub-corpus. Since these location names are practically used by users, the probability of being used again is relatively high. Including such location names into the first sub-corpus for matching can improve the accuracy of speech recognition.

The matching process as described above may involve calculation of a similarity between the feature word and the candidate word. According to the embodiment of the present disclosure, the similarity between the feature word and respective ones of the plurality of candidate words in the corpus are calculated.

Optionally, calculating the similarity includes: calculating a similarity measure between a vector of the feature word and the vector of respective ones of the plurality of candidate words. The similarity measure between vectors can reflect a degree of similarity between the feature word and the candidate word. When the similarity measure is greater than a predetermined threshold, it indicates that the degree of similarity between the feature word and the candidate word is high, and therefore the two are matched. Herein, the predetermined threshold may be set depending on different actual situations.

In step S203, by means of the preset correspondence between the erroneous candidate word and the standard candidate word, if the similarity between the feature word and any of the erroneous candidate words satisfies the predetermined condition, the standard candidate word may be output as a recognition result based on the preset correspondence.

Optionally, in the case of calculating the similarity measure by using the vector of the feature word and the vector of the candidate word, the predetermined condition is satisfied when the similarity measure is greater than the predetermined threshold. The similarity measure being greater than the predetermined threshold may indicate that the degree of similarity between the feature word and the candidate word is high, and therefore the matching between the two is implemented.

Optionally, the standard candidate word in the first sub-corpus may further include a standard candidate word that is obtained based on location information associated with the user, and accordingly the erroneous candidate word may include an erroneous candidate word that is phonetically similar to the standard candidate word, wherein there is a preset correspondence between the two. By means of the preset correspondence between the erroneous candidate word and the standard candidate word, if the similarity between the feature word and any of the erroneous candidate words satisfies the predetermined condition, the standard candidate word may be output as a recognition result based on the preset correspondence. In this way, location names having a high correlation with the user can be included into the first sub-corpus. Because these location names are very likely to be used by the users, additionally including such predictive extensions for the location names into the first sub-corpus for matching can improve the accuracy of speech recognition.

Optionally, the location information associated with the user may include a word associated with the location information that is obtained from user data of the at least one user. Therefore, the standard candidate word in the first sub-corpus may further include a word associated with the location information that is obtained from user data of the at least one user, and the erroneous candidate word includes a word that is preset based on a pronunciation similarity to the standard candidate word. In the example of the map or navigation application, the word associated with the location information may be obtained from user information pre-entered by the user in the application. For example, the user may have entered a home address, a company address, a frequently used address, and other location information in the application. In this way, it is possible to correlate to a location name frequently used by the user, whereby additionally including such predictive extensions for the location name into the first sub-corpus for matching can further improve the accuracy of speech recognition.

Figure 3:
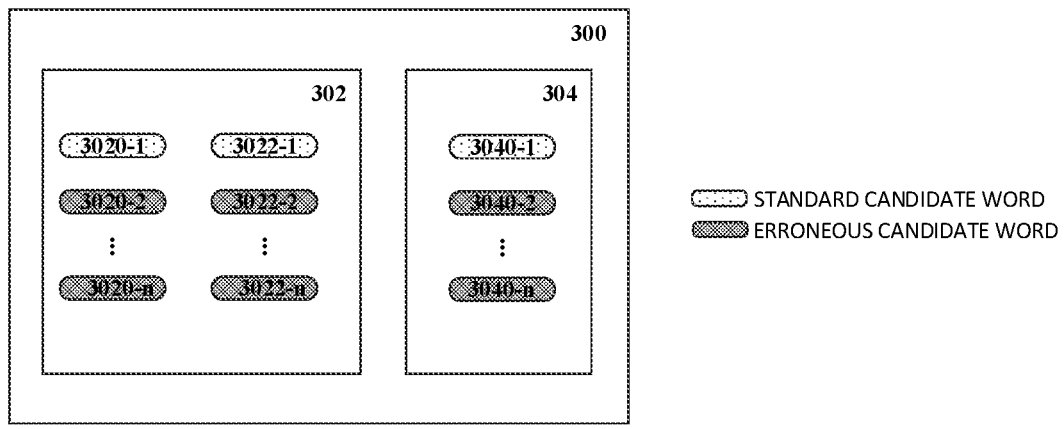
FIG. 3 is a schematic diagram of a corpus according to an embodiment of the present disclosure.

FIG. 3 illustrates a schematic diagram of a corpus according to an embodiment of the present disclosure. As shown in FIG. 3, the corpus 300 may include a first sub-corpus 302 and a second sub-corpus 304.

The first sub-corpus 302 may be the first sub-corpus as described above in conjunction with FIG. 1. The first sub-corpus 302 may be associated with at least one user. As shown in FIG. 3, the first sub-corpus 302 may include a first standard candidate word 3020-1 and first erroneous candidate words 3020-2 to 3020-n. The first standard candidate word 3020-1 may be obtained based on a user error-correction behavior of the at least one user, and the first erroneous candidate words 3020-2 to 3020-n may be phonetically similar to the first standard candidate word 3020-1. In addition, the first standard candidate word 3020-1 has a preset correspondence with each of the first erroneous candidate words 3020-2 to 3020-n. For example, each of the first erroneous candidate words 3020-2 to 3020-n may have a piece of information or a flag for indicating the mapping to the first standard candidate word 3020-1.

The first sub-corpus 302 may further include a second standard candidate word 3022-1 and second erroneous candidate words 3022-2 to 3022-n. The second standard candidate word 3022-1 may be obtained based on location information associated with the at least one user, and the second erroneous candidate words 3022-2 to 3022-n may be phonetically similar to the second standard candidate word 3022-1. Similarly, the second standard candidate word 3022-1 has a preset correspondence with each of the second erroneous candidate words 3022-2 to 3022-n. For example, each of the second erroneous candidate words 3022-2 to 3022-n may have a piece of information or a flag for indicating the mapping to the second standard candidate word 3022-1.

The second sub-corpus 304 may be associated with a local hot spot. The second sub-corpus 304 may include a third standard candidate word 3040-1 corresponding to the local hot spot. Due to the strong regional property of the local hot spot, the possibility of the users going to the region is relatively high. By means of including the local hot spot into the sub-corpus for matching, the accuracy of speech recognition can be further improved.

Optionally, the second sub-corpus 304 may further include third erroneous candidate words 3040-2 to 3040-n that are phonetically similar to the third standard candidate word 3040-1. Each of the third erroneous candidate words 3040-2 to 3040-n has a preset correspondence with the third standard candidate word 3040-1. For example, each of the third erroneous candidate words 3040-2 to 3040-n may have a piece of information or a flag for indicating the mapping to the third standard candidate word 3040-1. During the speech recognition, in response to the similarity between the extracted feature word and any of the third erroneous candidate words 3040-2 to 3040-n satisfying a predetermined condition, the third standard candidate word 3040-1 is output as a recognition result based on the preset correspondence. As a result, by means of including the predictive extensions for the local hot spot into the corpus for matching, the accuracy of speech recognition can be further improved.

Optionally, the third standard candidate word 3040-1 may be updated over time. As a result, the third standard candidate word can be up to date so that the accuracy of speech recognition can be further improved.

Figure 4:
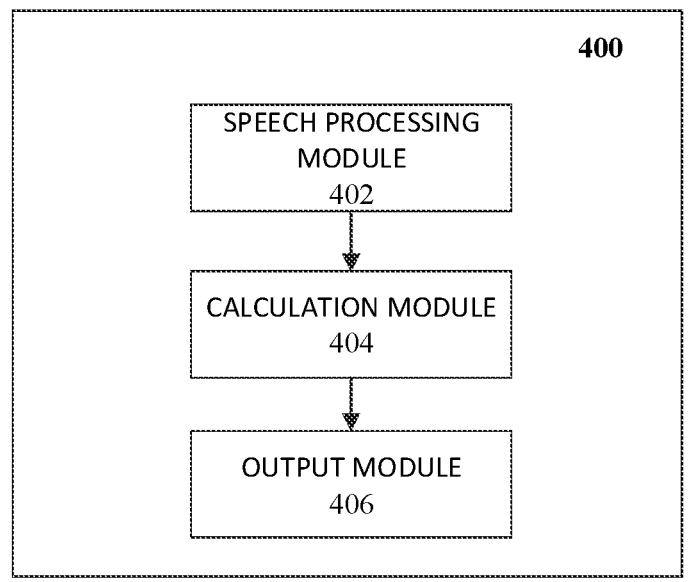
FIG. 4 is a block diagram of an apparatus for speech recognition according to an embodiment of the present disclosure.

According to another aspect of the present disclosure, an apparatus for speech recognition is further provided. FIG. 4 illustrates a block diagram of an apparatus for speech recognition according to an embodiment of the present disclosure. As shown in FIG. 4, the apparatus for speech recognition 400 may include:

a speech processing module 402, which may be configured to extract, from a speech to be recognized, a feature word associated with location information;

a calculation module 404, which may be configured to calculate a similarity between the feature word and respective ones of a plurality of candidate words in a corpus, wherein the corpus comprises a first sub-corpus associated with at least one user, and the plurality of candidate words comprise, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word; and an output module 406, which may be configured to, in response to the similarity between the feature word and any of the at least one first erroneous candidate word satisfying a predetermined condition, outputting the first standard candidate word as a recognition result based on the preset correspondence.

Optionally, the first standard candidate word may include a word associated with location information that has ever been erroneously recognized or had not been recognized, causing the user error-correction behavior, and the at least one first erroneous candidate word may include a word that is preset based on a pronunciation similarity to the first standard candidate word.

Optionally, the plurality of candidate words may further include, in the first sub-corpus, a second standard candidate word that is obtained based on location information associated with the at least one user, and at least one second erroneous candidate word that is phonetically similar to the second standard candidate word, wherein the at least one second erroneous candidate word has a preset correspondence with the second standard candidate word; and in response to the similarity between the feature word and any of the at least one second erroneous candidate word satisfying a predetermined condition, the second standard candidate word may be output as a recognition result based on the preset correspondence.

Optionally, the second standard candidate word may include a word associated with the location information that is obtained from user data of the at least one user, and the second erroneous candidate word may include a word that is preset based on a pronunciation similarity to the second standard candidate word.

Optionally, the corpus may further include a second sub-corpus associated with a local hot spot, and the plurality of candidate words further include, in the second sub-corpus, a third standard candidate word corresponding to the local hot spot.

Optionally, the plurality of candidate words may further include, in the second sub-corpus, at least one third erroneous candidate word that is phonetically similar to the third standard candidate word, wherein the at least one third erroneous candidate word has a preset correspondence between the third standard candidate word; and in response to the similarity between the feature word and any of the at least one third erroneous candidate word satisfying the predetermined condition, the third standard candidate word is output as a recognition result based on the preset correspondence.

The operations of the above modules 402, 404, and 406 of the apparatus for speech recognition 400 may respectively correspond to the operations of the steps S201, S202, and S203 described above in conjunction with FIG. 1, and details will not be repeated herein.

According to another aspect of the present disclosure, it is further provided an electronic device, comprising: at least one processor; and a memory communicatively connected to the at least one processor, wherein the memory stores instructions executable by the at least one processor, which, when executed by the at least one processor, cause the at least one processor to perform the method for speech recognition as described above.

According to another aspect of the present disclosure, it is further provided a non-transitory computer-readable storage medium storing computer instructions, wherein the computer instructions cause the computer to perform the method for speech recognition as described above.

According to another aspect of the present disclosure, it is further provided a computer program product, comprising a computer program, wherein the computer program, when executed by a processor, implements the method for speech recognition as described above.

Figure 5:
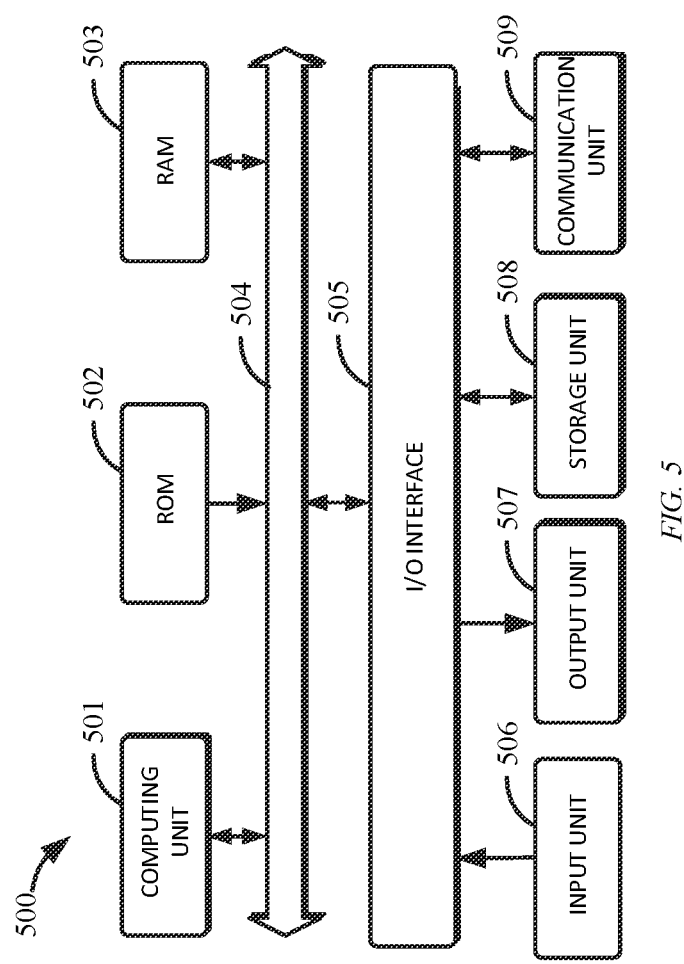
FIG. 5 is a structural block diagram of an example electronic device that can be used to implement an embodiment of the present disclosure.

Referring to FIG. 5, a structural block diagram of an electronic device 500 that may be applied to the present disclosure is now described, which is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or claimed herein.

As shown in FIG. 5, the electronic device 500 includes a computing unit 501, which may perform various appropriate actions and processing according to a computer program stored in a read-only memory (ROM) 502 or a computer program loaded from a storage unit 508 to a random access memory (RAM) 503. The RAM 503 may further store various programs and data required for the operation of the electronic device 500. The computing unit 501, the ROM 502, and the RAM 503 are connected to each other through a bus 504. An input/output (I/O) interface 505 is also connected to the bus 504.

A plurality of components in the electronic device 500 are connected to the I/O interface 505, comprising: an input unit 506, an output unit 507, the storage unit 508, and a communication unit 509. The input unit 506 may be any type of device capable of entering information to the electronic device 500. The input unit 506 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 507 may be any type of device capable of presenting information, and may include, but is not limited to, a display, a speaker, a video/audio output terminal, a vibrator, and/or a printer. The storage unit 508 may include, but is not limited to, a magnetic disk and an optical disc. The communication unit 509 allows the electronic device 500 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMax device, a cellular communication device and/or the like.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the method for speech recognition. For example, in some embodiments, the method for speech recognition may be implemented as a computer software program, which is tangibly contained in a machine-readable medium, such as the storage unit 508. In some embodiments, a part or all of the computer program may be loaded and/or installed onto the electronic device 500 via the ROM 502 and/or the communication unit 509. When the computer program is loaded to the RAM 503 and executed by the computing unit 501, one or more steps of the method for speech recognition described above can be performed. Alternatively, in other embodiments, the computing unit 501 may be configured, by any other suitable means (for example, by means of firmware), to perform the method for speech recognition.

Various implementations of the systems and technologies described herein above may be implemented in a digital electronic circuit system, an integrated circuit system, a field programmable gate array (FPGA), an application-specific integrated circuit (ASIC), an application-specific standard product (ASSP), a system-on-chip (SOC) system, a load programmable logical device (CPLD), computer hardware, firmware, software, and/or a combination thereof. These various implementations may include: the systems and technologies are implemented in one or more computer programs, wherein the one or more computer programs may be executed and/or interpreted on a programmable system comprising at least one programmable processor. The programmable processor may be a dedicated or general-purpose programmable processor that may receive data and instructions from a storage system, at least one input apparatus, and at least one output apparatus, and transmit data and instructions to the storage system, the at least one input apparatus, and the at least one output apparatus.

A program code used to implement the method of the present disclosure may be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein may be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses may also be used to provide interaction with the user; for example, a feedback provided to the user may be any form of sensory feedback (for example, a visual feedback, an auditory feedback, or a tactile feedback), and an input from the user may be received in any form (including an acoustic input, a voice input, or a tactile input).

The systems and technologies described herein may be implemented in a computing system (for example, as a data server) including a backend component, or in a computing system (for example, an application server) including a middleware component, or in a computing system (for example, a user computer with a graphical user interface or a web browser through which the user can interact with the implementation of the systems and technologies described herein) including a frontend component, or in a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

The computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps described in the present disclosure may be performed in parallel, sequentially, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems and devices described above are merely example embodiments or examples, and the scope of the present invention is not limited by the embodiments or examples, but only defined by the appended claims when allowed and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The invention claimed is:

1. A computer-implemented method for speech recognition, comprising:
    extracting, from a speech to be recognized, a feature word associated with location information;
    calculating a similarity between the feature word and respective ones of a plurality of candidate words in a corpus, wherein:
        the corpus comprises a first sub-corpus associated with at least one user,
        the plurality of candidate words comprises, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word,
        the corpus further comprises a second sub-corpus associated with a local hot spot, and
        the plurality of candidate words further comprises, in the second sub-corpus, a third standard candidate word, that corresponds to the local hot spot; and
    in response to the similarity between the feature word and one or more of the at least one first erroneous candidate word satisfying a predetermined condition, outputting the first standard candidate word as a recognition result based on the preset correspondence.

2. The method according to claim 1, wherein calculating the similarity comprises: calculating a similarity measure between a vector of the feature word and one or more vectors of respective ones of the plurality of candidate words.

3. The method according to claim 2, wherein the predetermined condition is satisfied when the similarity measure is greater than a predetermined threshold.

4. The method according to claim 1, wherein:
    the first standard candidate word comprises a word associated with location information, which has been erroneously recognized or has not been recognized, causing the user error-correction behavior, and
    the at least one first erroneous candidate word comprises a word that is preset based on a pronunciation similarity to the first standard candidate word.

5. The method according to claim 1, wherein:
    the plurality of candidate words further comprises, in the first sub-corpus, a second standard candidate word that is obtained based on location information associated with the at least one user, and at least one second erroneous candidate word that is phonetically similar to the second standard candidate word, wherein the at least one second erroneous candidate word has a preset correspondence with the second standard candidate word; and in response to the similarity between the feature word and one or more of the at least one second erroneous candidate word satisfying the predetermined condition, the second standard candidate word is output as a recognition result based on the preset correspondence.

6. The method according to claim 5, wherein:
the second standard candidate word comprises a word associated with location information that is obtained from user data of the at least one user, and
the at least one second erroneous candidate word comprises a word that is preset based on a pronunciation similarity to the second standard candidate word.

7. The method according to claim 1, wherein:
the plurality of candidate words further comprises, in the second sub-corpus, at least one third erroneous candidate word that is phonetically similar to the third standard candidate word, wherein the at least one third erroneous candidate word has a preset correspondence with the third standard candidate word; and
in response to the similarity between the feature word and one or more of the at least one third erroneous candidate word satisfying the predetermined condition, the third standard candidate word is output as a recognition result based on the preset correspondence.

8. The method according to claim 1, wherein the third standard candidate word is updated over time.

9. An electronic device, comprising:
at least one processor; and
a memory communicatively connected to the at least one processor, wherein
the memory stores instructions executable by the at least one processor, which, when executed by the at least one processor, cause the at least one processor to perform operations comprising:
extracting, from a speech to be recognized, a feature word associated with location information;
calculating a similarity between the feature word and respective ones of a plurality of candidate words in a corpus, wherein:
the corpus comprises a first sub-corpus associated with at least one user,
the plurality of candidate words comprise, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word,
the corpus further comprises a second sub-corpus associated with a local hot spot, and
the plurality of candidate words further comprises, in the second sub-corpus, a third standard candidate word, that corresponds to the local hot spot; and
in response to the similarity between the feature word and one or more of the at least one first erroneous candidate word satisfying a predetermined condition, outputting the first standard candidate word as a recognition result based on the preset correspondence.

10. The electronic device according to claim 9, wherein calculating the similarity comprises: calculating a similarity measure between a vector of the feature word and one or more vectors of respective ones of the plurality of candidate words.

11. The electronic device according to claim 10, wherein the predetermined condition is satisfied when the similarity measure is greater than a predetermined threshold.

12. The electronic device according to claim 9, wherein:
the first standard candidate word comprises a word associated with location information, which has been erroneously recognized or has not been recognized, causing the user error-correction behavior, and
the at least one first erroneous candidate word comprises a word that is preset based on a pronunciation similarity to the first standard candidate word.

13. The electronic device according to claim 9, wherein:
the plurality of candidate words further comprise, in the first sub-corpus, a second standard candidate word that is obtained based on location information associated with the at least one user, and at least one second erroneous candidate word that is phonetically similar to the second standard candidate word, wherein the at least one second erroneous candidate word has a preset correspondence with the second standard candidate word; and
in response to the similarity between the feature word and one or more of the at least one second erroneous candidate word satisfying the predetermined condition, the second standard candidate word is output as a recognition result based on the preset correspondence.

14. The electronic device according to claim 13, wherein the second standard candidate word comprises a word associated with location information that is obtained from user data of the at least one user, and
the at least one second erroneous candidate word comprises a word that is preset based on a pronunciation similarity to the second standard candidate word.

15. The electronic device according to claim 9, wherein:
the plurality of candidate words further comprise, in the second sub-corpus, at least one third erroneous candidate word that is phonetically similar to the third standard candidate word, wherein the at least one third erroneous candidate word has a preset correspondence with the third standard candidate word; and
in response to the similarity between the feature word and one or more of the at least one third erroneous candidate word satisfying the predetermined condition, the third standard candidate word is output as a recognition result based on the preset correspondence.

16. The electronic device according to claim 9, wherein the third standard candidate word is updated over time.

17. A non-transitory computer-readable storage medium storing computer instructions, wherein the computer instructions are used to cause the computer to perform operations comprising:
extracting, from a speech to be recognized, a feature word associated with location information;
calculating a similarity between the feature word and respective ones of a plurality of candidate words in a corpus, wherein:
the corpus comprises a first sub-corpus associated with at least one user, and
the plurality of candidate words comprise, in the first sub-corpus, a first standard candidate word that is obtained based on a user error-correction behavior of the at least one user, and at least one first erroneous candidate word that is phonetically similar to the first standard candidate word, wherein the at least one first erroneous candidate word has a preset correspondence with the first standard candidate word,
the corpus further comprises a second sub-corpus associated with a local hot spot, and
the plurality of candidate words further comprises, in the second sub-corpus, a third standard candidate word, that corresponds to the local hot spot; and
in response to the similarity between the feature word and one or more of the at least one first erroneous candidate word satisfying a predetermined condition, outputting the first standard candidate word as a recognition result based on the preset correspondence.

* * * * *